(12) United States Patent
Michel De Arevalo et al.

(10) Patent No.: US 8,486,157 B2
(45) Date of Patent: Jul. 16, 2013

(54) PROCESS FOR THE PHASE TRANSFORMATION OF SUBSTANCES

(75) Inventors: Aymee Lisette Michel De Arevalo, Bruchkoebel (DE); Patrik Stenner, Hanau (DE); Stefan Fiedler, Loerrach (DE); Dieter Kerner, Hanau (DE); Manfred Nagel, Maintal (DE)

(73) Assignee: Evonik Degussa GmbH, Essen (DE)

( * ) Notice: Subject to any disclaimer, the term of this patent is extended or adjusted under 35 U.S.C. 154(b) by 325 days.

(21) Appl. No.: 12/991,721

(22) PCT Filed: May 7, 2009

(86) PCT No.: PCT/EP2009/055548
§ 371 (c)(1), (2), (4) Date: Nov. 9, 2010

(87) PCT Pub. No.: WO2009/141234
PCT Pub. Date: Nov. 26, 2009

(65) Prior Publication Data
US 2011/0123424 A1 May 26, 2011

(30) Foreign Application Priority Data
May 19, 2008 (DE) .......................... 10 2008 001 851

(51) Int. Cl.
*B01D 7/00* (2006.01)

(52) U.S. Cl.
USPC ............................................ 23/294 R; 23/296

(58) Field of Classification Search
USPC ...................... 23/294 R, 295 R, 296
See application file for complete search history.

(56) References Cited

U.S. PATENT DOCUMENTS

| 5,213,851 A | 5/1993 | Snyder et al. |
| 5,478,608 A | 12/1995 | Gorokhovsky |
| 5,749,937 A | 5/1998 | Detering et al. |
| 5,935,293 A | 8/1999 | Detering et al. |

FOREIGN PATENT DOCUMENTS

JP 2006 247446 9/2006

OTHER PUBLICATIONS

International Search Report issued Oct. 6, 2009 in PCT/EP09/55548 filed May 7, 2009.

*Primary Examiner* — Edward Johnson
(74) *Attorney, Agent, or Firm* — Oblon, Spivak, McClelland, Maier & Neustadt, L.L.P.

(57) ABSTRACT

Process for the phase transformation of substances and mixtures of substances, in which the substance or the mixture of substances is introduced into a plasma reactor, the substance or the mixture of substances is converted into the higher-energy phase and the product is removed in gaseous form from the plasma reactor. The process can be used for the sublimation of metal salts, metal nitrates and/or metal alkoxides and other vaporizable metal-organic compounds.

10 Claims, 1 Drawing Sheet

PROCESS FOR THE PHASE TRANSFORMATION OF SUBSTANCES

FIELD OF THE INVENTION

Background of the Invention

The invention relates to a process for the phase transformation of substances and mixtures of substances.

Vaporizing aluminium trichloride by using a U-shaped trough which has flat end faces and is heated from the outside by means of heating rods is known (DE 29 28 805).

A disadvantage is that the aggressive salt melt of aluminium trichloride leads, as a result of abrasion and corrosion of the material of which the trough and the rotating parts are manufactured, to contamination of the desired gaseous aluminium trichloride.

The known process also has the disadvantage that a very large apparatus volume has to be provided in order to be able to achieve an appropriate throughput and to be able to provide a sufficiently large quantity of heat and surface area for the phase transformation. The long reaction times for starting up and shutting down the apparatus which are associated therewith have an adverse effect on the dynamic behaviour of the system.

Furthermore, the handling of the large apparatus volume requires a complicated safety concept in order to avoid, for example, excess pressure caused by, for example, closed valves while the heating system is in operation or encrustation or blocking of movable, insufficiently heated control valves as a result of desublimation.

In addition, driveshafts have to be sealed in a gastight manner from the outside, which can be achieved only by means of costly construction and complicated operational measures.

Further known apparatus concepts are based on rotating parts in the interior of a reactor (U.S. Pat. No. 5,711,089 and DE 196 13 125 C1), which likewise have disadvantages such as abrasion and corrosion. Further known systems which are open to the outside (DE 199 04 196 C1) are likewise unsuitable for aggressive and corrosive metal salts.

DE 102 42 797 A1 discloses an apparatus for radiation-induced phase transformation, which comprises a reactor having a vessel or tubular reactor wall, facilities for introducing and taking off the substance or mixture of substances to be transformed into and from the reactor and an electromagnetic radiation source outside the reactor, wherein the radiation source is an infrared (IR), visible light (VIS), ultraviolet (UV) or microwave radiator, the reactor wall consists, in at least one region, of a radiation-transparent material, the radiator is arranged so as to be protected from the product, and the radiative heat is transferred without contact and directly into the product.

This apparatus has the disadvantage that only relatively small amounts can be treated.

WO 96/22867 describes an apparatus for the heat treatment of polymer-containing bulk goods in screw conveyors, in which the heat input from heat radiation sources acts directly on the material being conveyed in the transport-active region of the screw conveyor.

WO 95/13130 describes a process for producing granular materials in an inclined drum, in which an infrared radiator extending over the entire length of the drum can be arranged in the interior of the drum. Screw flights as are known from CH 478591 A1 can be affixed to the interior of the drum.

These documents do not describe materials transformation such as the sublimation of aluminium trichloride and the further treatment of the gaseous product.

DE 10 2005 022 707 A1 describes a process for the radiation-induced phase transformation of substances and mixtures of substances, in which the substance or mixture of substances is moved in a helical tube, irradiated by means of an electromagnetic radiation source and the product is removed from the rotating helical tube.

This process has the disadvantage that unsolved sealing problems occur in the rotating helical tube.

It was therefore an object of the invention to develop a process and an apparatus which do not have these disadvantages.

SUMMARY OF THE INVENTION

The invention provides a process for the phase transformation of substances and mixtures of substances, which is characterized in that the substance or the mixture of substances is introduced into a plasma reactor, the substance or the mixture of substances is converted into the higher-energy phase and the product is removed in gaseous form or as aerosol in a suitable form from the plasma reactor and/or passed to its use.

BRIEF DESCRIPTION OF THE DRAWINGS

The process of the invention and also a reactor which can be used according to the invention are shown schematically in FIG. 1.

DETAILED DESCRIPTION OF THE INVENTION

Figure 1:
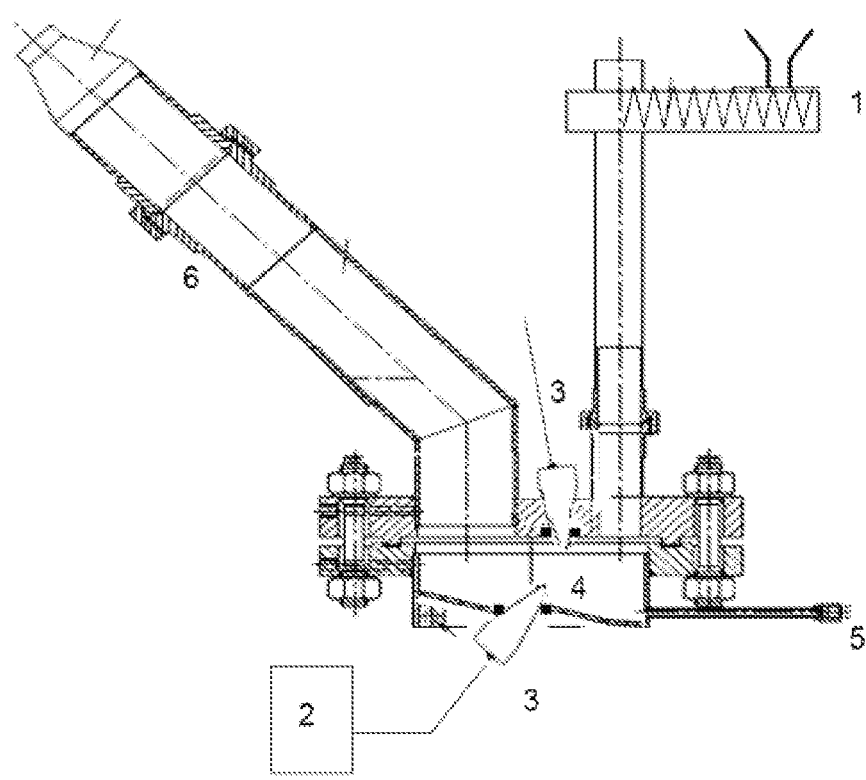

The process of the invention and the apparatus of the invention can be used for the physical phase transformation, in particular the vaporization and the sublimation, of metal salts, metal nitrates and/or metal alkoxides and other vaporizable metal-organic compounds. The substance or the mixture of substances can be introduced as solid phase, for example in granular form, as liquid phase or as suspension into the reactor.

For the purposes of the present invention, phase transformation is the transformation which a substance or mixture of substances experiences when energy is introduced into it.

Phase transformation can therefore be, in particular, vaporization, sublimation, melting, drying and/or formation of aerosols, i.e. a mixture of gaseous phase and liquid or solid phase.

The process of the invention can be used, for example, for the vaporization of metal halides such as $SiCl_4$, $TiCl_4$, $SnCl_4$, $VdCl_4$; metal nitrates, metal alkoxides; for the sublimation of solids such as metal salts from the group consisting of the metal halides $AlCl_3$, $ZrCl_4$, $NbCl_4$, $InCl_3$, $FeCl_3$; for the melting and, if desired, subsequent vaporization of solids such as metal salts from the group consisting of $YCl_3$, $SnCl_2$, $NbCl_5$, $FeCl_2$; for the initiation of chemical reactions.

In a preferred embodiment of the invention, the process of the invention can be used for the sublimation of aluminium trichloride.

In an embodiment of the invention, the plasma reactor can be operated at atmospheric pressure and a temperature of from 20 to 400° C.

In an embodiment of the invention, the phase transformation can be effected in a reactor having a particular atmosphere.

The particular atmosphere can be, for example: reduced pressure, atmospheric pressure, superatmospheric pressure. The gas atmosphere and the gas pressure can be chosen freely.

Plasma treatment is a process known in the literature. The difference between the known plasma treatments and the process of the invention is that in the process of the invention it is not the electric arc which is utilized as hottest source for sublimation/vaporization but the ionized gas generated by the discharge. The discharge to generate the plasma takes place outside the plasma zone. This makes vaporization/sublimation at lower temperatures possible.

Sublimation takes place as a result of the high-energy plasma zone.

However, an elevated temperature in the reactor is necessary to prevent desublimation.

As plasma, it is possible to use all gases which do not undergo any reaction with the material to be sublimed, for example argon, nitrogen, helium.

No oxygen is present in the plasma.

Sublimation can be carried out at a pressure of from 0.0001 to 1 bar.

According to the invention, nitrogen can serve both as plasma gas and as carrier gas for the substance or the mixture of substances.

The reactor can have any design. It should merely be ensured that the reactor can be used at elevated temperature and in a corrosive environment.

The reaction chamber of the reactor can have an inlet for the substance or the mixture of substances and an outlet for the substance or the mixture of substances in the higher-energy phase.

Furthermore, the reactor can have one or more openings for insertion of the plasma nozzles.

Figure 2:
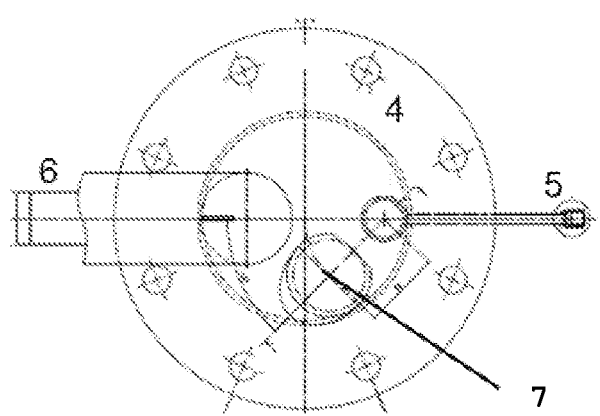
FIG. 2 is a top/plan view of the apparatus shown in side view in FIG. 1.

The process of the invention and also a reactor which can be used according to the invention are shown schematically in FIG. 1 and FIG. 2.

According to FIG. 1 and FIG. 2, solid aluminium trichloride is introduced by means of the feed screw 1 into the plasma reactor 4 after the plasma reactor has reached the sublimation temperature.

The plasma reactor 4 is heated by means of the plasma generator 2 and the plasma nozzles 3 which are inserted into the plasma nozzle opening(s) 7, with the temperature being checked by means of the temperature sensor 5. The aluminium trichloride is sublimed by contact with the ionized gas.

The sublimed aluminium chloride is discharged from the plasma reactor 4 via the heatable gas outlet 6, which is heated to 220° C., and passed to its use.

As plasma generator, it is possible to use, for example, the plasma generator FG 3001 from Plasmatreat.

As plasma nozzle 3, it is possible to use, for example, the plasma nozzle PFW 10 from Plasmatreat.

The process of the invention makes it possible to vaporize aluminium trichloride even in relatively large amounts.

The invention claimed is:

1. A process for the phase transformation of a substance or a mixture of substances, comprising introducing the substance or the mixture of substances into a plasma reactor, converting the substance or the mixture of substances into the higher-energy phase, and removing the product in gaseous form or as aerosol in a suitable form from the plasma reactor.

2. The process according to claim 1, wherein the substance comprises a metal salt, a metal nitrate a metal alkoxide and/or other vaporizable metal-organic compounds.

3. The process according to claim 1, wherein the substance comprises a metal halide or a metal nitrate or a metal alkoxide which is vaporized in the process.

4. The process according to claim 1, wherein the substance comprises a metal halide which is sublimed in the process.

5. The process according to claim 1, wherein the substance comprises a metal salt which is melted and, optionally, subsequently vaporized in the process.

6. The process according to claim 4, wherein the substance comprises aluminium trichloride which is sublimed in the process.

7. The process according to claim 1, wherein the phase conversion occurs in the ionized gas generated by the discharge.

8. The process according to claim 3, wherein the substance comprises a metal halide selected from the group consisting of $SiCl_4$, $TiCl_4$, $SnCl_4$, and $VdCl_4$.

9. The process according to claim 4, wherein the substance comprises a metal halide selected from the group consisting of $AlCl_3$, $ZrCl_4$, $NbCl_4$, $InCl_3$, and $FeCl_3$.

10. The process according to claim 5, wherein the substance comprises a metal salt selected from the group consisting of $YCl_3$, $SnCl_2$, $NbCl_4$ and $FeCl_2$.

* * * * *